United States Patent [19]

Hamada

[11] Patent Number: 5,535,269
[45] Date of Patent: Jul. 9, 1996

[54] ADDITIONAL DIRECT INWARD DIALING CONNECTION SYSTEM

[75] Inventor: Takumu Hamada, Tokyo, Japan

[73] Assignee: NEC Corporation, Tokyo, Japan

[21] Appl. No.: 394,956

[22] Filed: Feb. 27, 1995

[30] Foreign Application Priority Data

Feb. 28, 1994 [JP] Japan ................................. 6-029927

[51] Int. Cl.⁶ ........................... H04M 7/00; H04M 1/64; H04M 3/00; H04M 3/42
[52] U.S. Cl. ........................... 379/233; 379/88; 379/194; 379/212; 379/213; 379/258; 379/277
[58] Field of Search ................................. 379/212, 213, 379/214, 67, 88, 89, 233, 211, 257, 258, 245, 246, 194, 277

[56] References Cited

U.S. PATENT DOCUMENTS

| 4,926,462 | 5/1990 | Ladd et al. | 379/212 X |
| 4,969,182 | 11/1990 | Ohtsubo et al. | 379/213 X |

FOREIGN PATENT DOCUMENTS 60-84090 5/1985 Japan.
3-123295 5/1991 Japan.

*Primary Examiner*—Jeffery Hofsass
*Assistant Examiner*—Harry S. Hong
*Attorney, Agent, or Firm*—Sughrue, Mion, Zinn, Macpeak & Seas

[57] ABSTRACT

An additional direct inward dialing connection system includes a determining section, announcement machines, and a connection control section. When a direct inward dialing number from a caller is received via an office line or public telephone network, the determining section determines on the basis of the state of a called station terminal whether connection to the called station terminal can be established. When an output from the determining section indicates that connection to the called station terminal is not possible, one of the announcement machines notifies the caller of the reason for connection failure based on the state of the called station terminal. The machine also announces the number of a station terminal that may additionally dialed. When the number of the station terminal is received upon additional dialing performed by the caller, the connection control section connects a call from the caller to the station terminal corresponding to the received number.

9 Claims, 2 Drawing Sheets

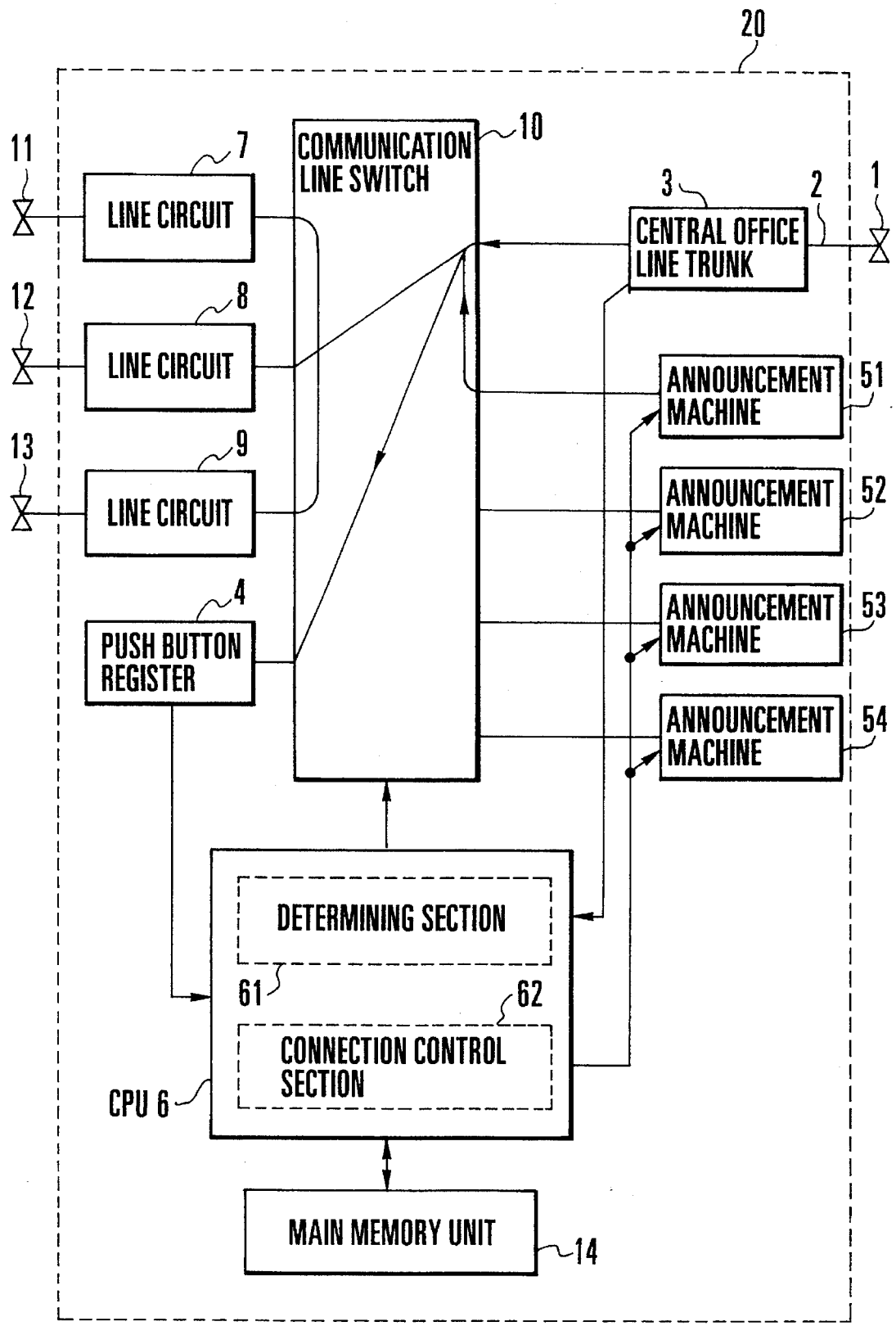
F I G. 1

ADDITIONAL DIRECT INWARD DIALING CONNECTION SYSTEM

BACKGROUND OF THE INVENTION

The present invention relates to an additional direct inward dialing connection system and, more particularly, to an additional direct inward dialing connection system using speech to prompt a caller to perform an additional dialing operation when connection to a station terminal cannot be established in a direct inward dialing function from an office line in an automatic private branch exchange.

As a system for implementing an extension telephone in an automatic private branch exchange to terminate a call from an office line, a direct inward dialing connection system is generally used. In this direct inward dialing connection system, when the extension of a telephone is dialed after the user of an originating telephone set connected to an office line dials a direct inward dialing number, a call is made to the extension telephone in an idle state. To remedy the situation where a called extension telephone set is in a busy state, an additional direct inward dialing connection system for accepting additionally dialed extensions corresponding other telephone extensions are available. Conventional direct inward dialing connection systems will be described below.

In a first conventional method, the "PBX Direct Inward Dialing Connection System" disclosed in Japanese Patent Laid-Open No. 3-123295, a PBX exchange capable of performing PBX direct inward dialing connection includes a means for receiving an additionally dialed PBX extension number which is output from an originating telephone set to designate a telephone set other than the telephone set which is in a busy state for which a connection was attempted. This first conventional method also provides a means for connecting the originating telephone set to the extension telephone set for which the additional dialing operation has been performed, in accordance with the received PBX extension number. When a telephone set or telephone set group is in a busy state, the originating telephone set can be connected to another extension telephone set for which an additional dialing operation is performed.

In a second conventional method, the "Office Line Terminating Connection System" disclosed in Japanese Patent Laid-Open No. 60-84090, an automatic private branch exchange also accommodates an office line allowing an additional dialing operation. When office line connecting is attempted with respect to another office line while all input registers for receiving additionally dialed signals are in a busy state, the office line subscriber on the originating telephone set is notified by audible means that the call is being transferred to an attendant console or office line termination display panel. Information about the call is displayed on the attendant console or office line termination display panel and the office line subscriber is precluded from performing re-dialing operations including additional dialing operations.

In the first conventional method, when a telephone set or telephone set group is in a busy state, a call is attempted to another extension telephone set on the basis of the additionally dialed number designated by the caller. If, therefore, this substitute extension telephone is also in a busy state, an additional dialing operation or re-dialing operation must be performed.

The second conventional system is limited to a case wherein while all the input registers for receiving additional dial signals from office line subscribers are in a busy state, an office line subscriber is notified by speech that the call is being transferred to the attendant console or office line termination display panel. However, any description about application of the system to cases wherein a called extension terminal is in a busy state or lock-out state cannot be recognized.

SUMMARY OF THE INVENTION

It is an object of the present invention to provide an additional direct inward dialing connection system in which a call always is connected to a terminal designated by an automatic private branch exchange by only one additional dialing operation performed by the caller.

In order to achieve the above object, according to the present invention, there is provided an additional direct inward dialing connection system, comprising a determining means for, when a direct inward dialing number from a caller is received via an office line, determining on the basis of a state of a called station terminal whether to the called station terminal can be established; a notifying means for, when an output from the determining means indicates that the called station terminal is disabled, notifying the caller of a reason for the failed connection based on the state of the called station terminal and for notifying the caller of a number of a terminating station terminal to be additionally dialed; and a connection control means for, when the number of the station terminal is received upon additional dialing performed by the caller, connecting a call from the caller to the station terminal corresponding to the received number.

BRIEF DESCRIPTION OF THE DRAWINGS

FIG. 1 is a block diagram showing an automatic private branch exchange in an additional direct inward dialing connection system according to an embodiment of the present invention.

DESCRIPTION OF THE PREFERRED EMBODIMENT

Figure 2:
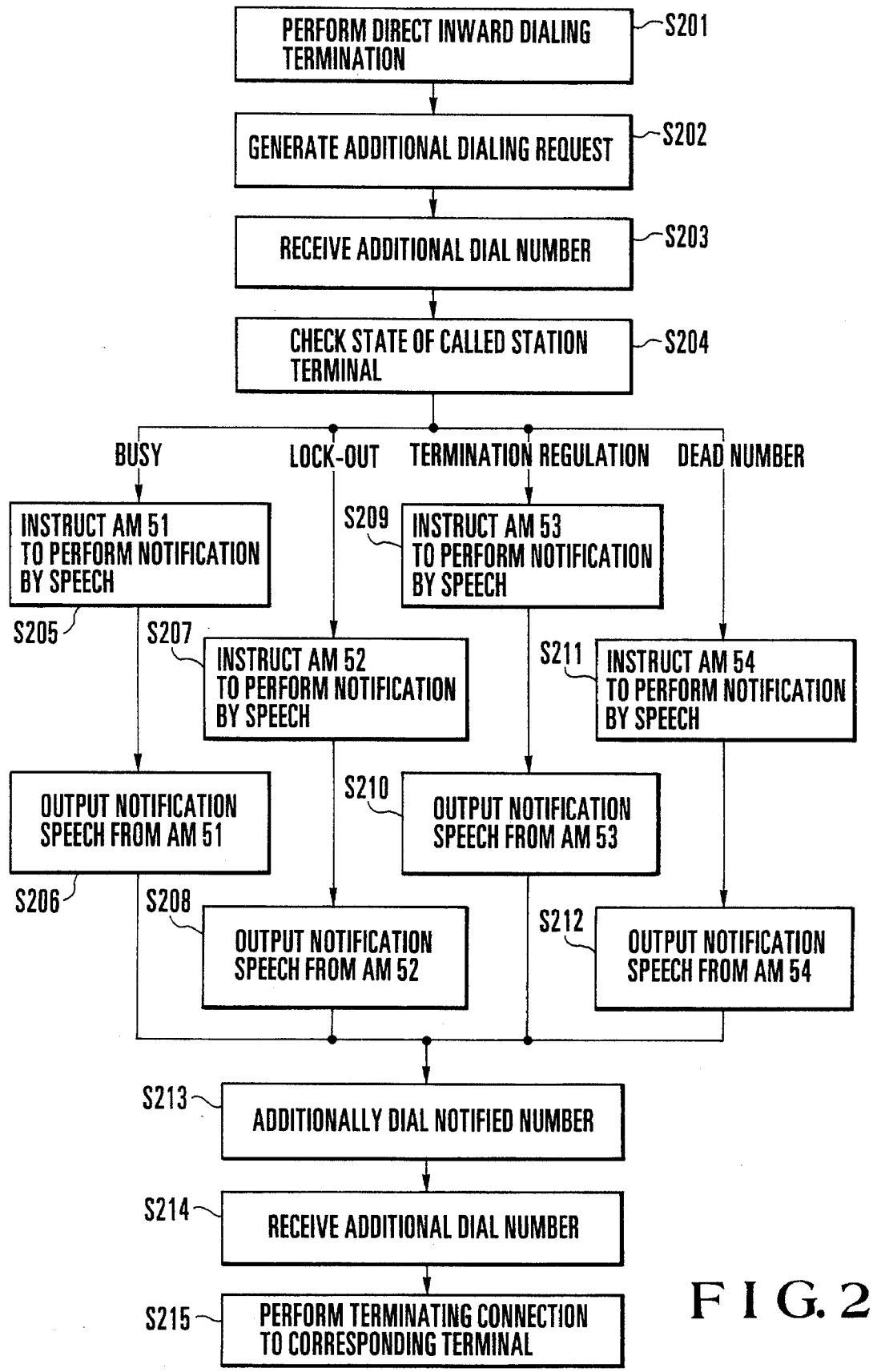
FIG. 2 is a flow chart for explaining the operation of the additional direct inward dialing connection system in FIG. 1.

The present invention will be described below with reference to the accompanying drawings.

FIG. 1 shows an automatic private branch exchange in an additional direct inward dialing connection system according to an embodiment of the present invention. FIG. 2 explains the operation of the embodiment.

Referring to FIG. 1, an automatic private branch exchange 20, which accommodates an office line allowing an additional dialing operation, includes a central office line trunk (COT) 3, a push button register (PBR) 4, announcement machines (to be AMs) 51, 52, 53, and 54, a central processing unit (CPU) 6, line circuits (LCs) 7, 8, and 9, a communication line switch (SW) 10, and a main memory unit 14. The COT 3 interfaces with an office line subscriber 1 via an office line 2 or a public telephone network (not shown). The PBR 4 receives a dial signal from the office line subscriber 1 via the COT 3, the office line 2, and the above public telephone network when direct inward dialing connection is performed. When a terminating connection for a called station terminal cannot be established, one of the AMs 51, 52, 53, and 54 outputs a terminal number to be additionally dialed, together with a reason for the connection failure. When the office line subscriber 1 additionally dials this additional terminal number, the CPU 6 performs control to connect the call to a terminal corresponding to the additionally dialed number in accordance with a designation from the PBR 4 which has received the terminal number. The LCs 7, 8, and 9 are respectively connected to station terminals (STAs) 11, 12, and 13 including extension telephone sets. The SW 10 accommodates the COT 3, the PBR 4, the AMs 51, 52, 53, and 54, and the LCs 7, 8, and 9 and performs connection therebetween. The main memory unit 14 stores programs and data for all sequence control operations in the automatic private branch exchange 20, which are performed by the CPU 6.

The CPU 6 includes a determining section 61 and a connection control section 62. The determining section 61 determines, on the basis of state data and the like of the STAs 11 to 13 stored in the state memory area of the main memory unit 14, whether termination to a called station terminal can be performed. The connection control section 62 connects a call from a caller, which is generated when he/she additionally dials a destination terminal number provided by one of the AMs 51 to 54, to the destination terminal designated by the additional dialing operation via the SW 10.

The operation of the embodiment will be described next with reference to a flow chart shown in FIG. 2.

Assume that the STAs 11 and 12 belong to the same extension group, but the STA 13 does not belong thereto. Let XX and YY be the extension numbers of the STAs 11 and 12, and ZZ be the terminal number of a maintenance terminal (not shown). Also assume that speech communication is being performed between the STAs 11 and 13 via the LC 7, the SW 10, and the LC 9.

When the office line subscriber 1 dials a direct inward dialing number with respect to the automatic private branch exchange 20 in this state, this call is terminated to the COT 3 via the office line 2 (step S201).

When the COT 3 notifies the CPU 6 of this office line termination, the CPU 6 controls the SW 10 to set a link between the COT 3 and the PBR 4, and urges the office line subscriber 1 by a known method using a tone or speech to perform an additional dialing operation (step S202).

When the office line subscriber 1 additionally dials the extension number XX, the PBR 4 receives the number and transfers it to the CPU 6 (step S203).

When the determining section 61 of the CPU 6 recognizes, on the basis of state data and the like in the main memory unit 14, that the called STA 11 is in a busy state (step S204), the determining section 61 controls the SW 10 to set a link between the COT 3 and the AM 51 and check an available station terminal in the same group to which the STA 11 belongs, thereby transferring the extension number YY of the available STA 12 to the AM 51 (step S205).

The AM 51 outputs instruction such as "Please dial the number YY because the telephone set of the extension number XX is busy" in accordance with the above information from the CPU 6 (step S206).

This instruction is delivered to the office line subscriber 1 via the SW 10, COT 3, and the office line 2. The office line subscriber 1 then additionally dials the number YY (step S213).

This number YY is received by the PBR 4 via the COT 3 and the SW 10 (step S214). The number is transferred from the PBR 4 to the CPU 6. The connection control section 62 of the CPU 6 performs connection control with respect to the STA 12 corresponding to the number YY by a known method like the one disclosed in Japanese Patent Laid-Open No. 3-123295 described above (step S215).

When a direct inward dialing connection request is generated with respect to the STA 11 which in a lock-out state, the determining section 61 of the CPU 6 recognizes the lock-out state of the called STA 11 in step S204 on the basis of state data and the like in the main memory unit 14, and instructs the AM 52 to instruct the office line subscriber 1 by speech (steps S207 and S208). The instruction in this case is, for example, "Please dial the number YY because the extension telephone set of the extension number XX is in an off-hook state."

When a direct inward dialing connection request is generated with respect to the STA 11 while termination thereto is regulated, the determining section 61 of the CPU 6 recognizes the termination regulation imposed on the called STA 11 in step S204 on the basis of state data and the like in the main memory unit 14, and instructs the AM 53 to instruct the office line subscriber 1 by speech (steps S209 and S210). The instruction in this case is, for example, "Please dial the number ZZ because connection to the telephone set of the extension number XX is being regulated." When the office line subscriber 1 additionally dials the number ZZ, this call is terminated/connected to the maintenance terminal by the connection control section 62.

When a direct inward dialing connection request is generated with respect to the STA 13 corresponding to a dead number, the determining section 61 of the CPU 6 recognizes in step S204, on the basis of state data and the like in the main memory unit 14, that the called STA 13 corresponds to a dead number, and instructs the AM 54 to instruct the office line subscriber 1 by speech (steps S211 and S212). The instruction speech in this case, is, for example, "Please dial the number ZZ because the dialed number is a dead number."

As described above, according to the present invention, when connection to a called station terminal designated by a direct inward dialing number from an originating office line subscriber is disabled, the automatic private branch exchange notifies the caller of the reason for the failed connection and a number to be additionally dialed. Therefore, a call from the caller is connected to a terminating terminal designated by the automatic private branch exchange without fail by performing only one additional dialing operation.

In this embodiment, connection to a called station terminal is disabled because of the busy or lock-out state of the called station terminal, terminating connection regulation, or a dead number. However, the present invention is not limited to these reasons for connection failure.

For example, when the present invention is to be applied to a case wherein a transfer service is registered in a called station terminal, only the information about transfer may be given to the caller, and the call may be connected to the transfer destination without notifying the caller of an additional number to dial. When an additional number different from the one given by the notifying means is received, a termination transfer destination may be determined in accordance with the received additional dial number, or only the given additional number may be received.

Furthermore, in this embodiment, the announcement machines 51 to 54 each execute speech notification for each cause of terminating connection failure. Each are activated by a particular form of traffic. However, one speech instruction unit may have the functions of the above plurality of announcement machines. Such a speech guide unit may be activated by different forms of traffic.

As has been described above, according to the present invention, since a call is connected to a terminal designated by the automatic private branch exchange without fail by only one additional dialing operation performed by the caller, the caller will not need to redial a direct inward dialing number or perform an additional dialing operation again.

Therefore, considerable improvement in service, can be achieved, and the incomplete connection traffic can be reduced.

What is claimed is:

1. A call connection system, comprising:

a determining means for determining, on the basis of status data for a called station terminal, whether termination to the called station terminal can be established and for selectively identifying a station terminal for which termination can be established when termination to the called station terminal cannot be established;

a notifying means, responsive to said determining means, for notifying a caller of a reason for disabled termination when an output from said determining means indicates that termination to the called station terminal cannot be established and for notifying said caller of a number corresponding to the station terminal for which a termination can be established; and a connection control means for connecting a call from the caller to a station terminal corresponding to a number dialed by said caller.

2. A system according to claim 1, wherein said notifying means further comprises: a speech generating means for notifying the caller of the number corresponding to the station terminal for which termination can be established and for notifying the caller of a reason for disabled termination to the called station terminal.

3. A system according to claim 2, wherein said speech generating means further comprises: a plurality of announcement machines.

4. A system according to claim 3, wherein said determining means determines the status data for the called station terminal corresponding to at least one of a busy state, a lock-out state, a state of connection regulation, and a dead number state when termination to the called station terminal cannot be established, and said determining means starts one of said announcement machines corresponding to the status data for the called station terminal.

5. A system according to claim 1, further comprising a memory means for storing status data for a plurality of station terminals, and wherein said determining means determines, by referring to said memory means, whether termination to the called station terminal can be established and wherein said determining means identifies, by referring to said memory means, a station terminal for which a termination can be established when termination to the called station terminal cannot be established.

6. A system according to claim 1, further comprising: a reception means for receiving a station terminal number upon dialing performed by the caller, and communication line switch means for connecting a communication line to said notifying means, and a plurality of station terminals controlled by said connection control means.

7. A call connection system, comprising:

a determining means for determining, on the basis of status data for a called station terminal, whether termination to the called station terminal can be established and for selectively identifying a station terminal for which termination can be established when termination to the called station terminal cannot be established;

a notifying means, comprising a speech generating means and responsive to said determining means, for notifying a caller of a reason for disabled termination when an output from said determining means indicates that termination to the called station terminal cannot be established and for notifying said caller of a number corresponding to the station terminal for which a termination can be established;

a connection control means for connecting a call from the caller to a station terminal corresponding to a number dialed by said caller;

a memory means for storing status data for a plurality of station terminals, wherein said determining means determines, by referring to said memory means, whether termination to a called station terminal can be established and wherein said determining means identifies, by referring to said memory means, a station terminal for which a termination can be established when termination to the called station terminal cannot be established;

a reception means for receiving a station terminal number upon dialing performed by the caller;

a communication line switch means for connecting a communication line to said notifying means; and a plurality of station terminal controlled by said connection control means.

8. A system according to claim 7, wherein said speech generating means further comprises:

a plurality of announcement machines.

9. A system according to claim 8, wherein said determining means determines the status data for the called station terminal corresponding to at least one of a busy state, a lock-out state, a state of connection regulation, and a dead number state when termination to the called station terminal cannot be established, and said determining means starts one of said announcement machines corresponding to the status data for the called station terminal.

* * * * *